June 10, 1958  A. W. J. WELLS  2,838,267
ANTI-VIBRATION MOUNTING DEVICES
Filed Feb. 1, 1954  2 Sheets-Sheet 1
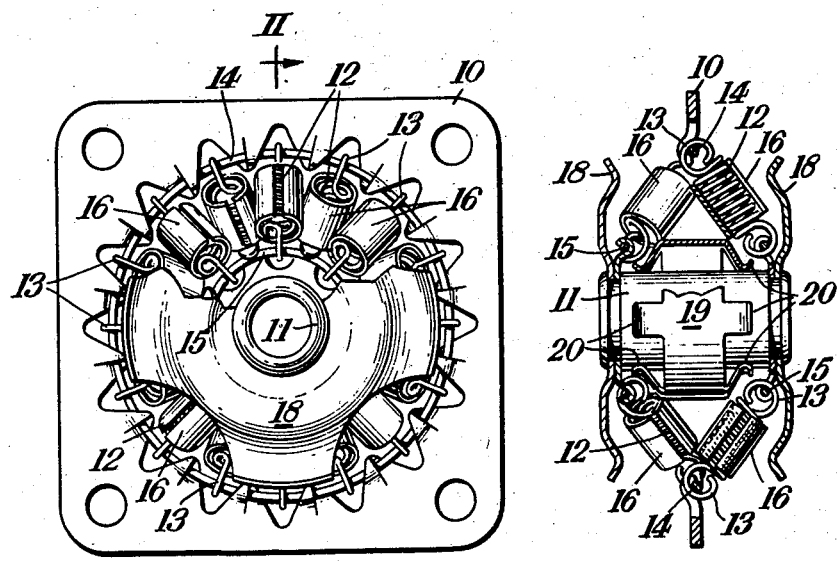
Fig. 1.  Fig. 2.
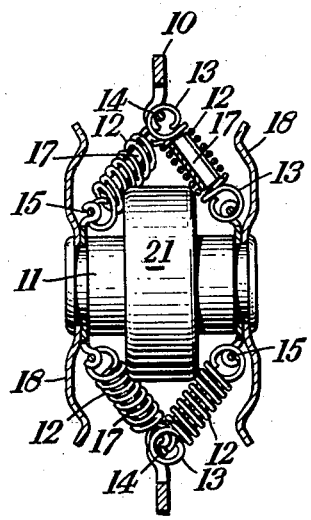  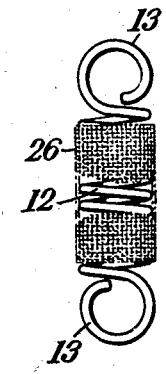
Fig. 3.  Fig. 4.
INVENTOR:
ALFRED WILLIAM JOHN WELLS,
BY Philip E. Parker
ATTORNEY.

June 10, 1958  A. W. J. WELLS  2,838,267
ANTI-VIBRATION MOUNTING DEVICES
Filed Feb. 1, 1954  2 Sheets-Sheet 2
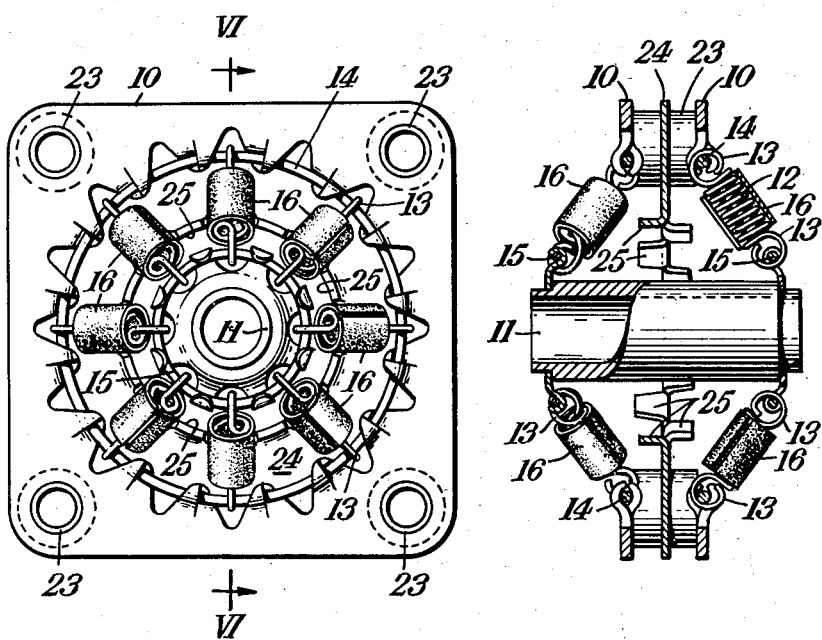
*Fig. 5.*   *Fig. 6.*
INVENTOR:
ALFRED WILLIAM JOHN WELLS,
BY Philip E. Parker
ATTORNEY.

United States Patent Office 2,838,267
Patented June 10, 1958

2,838,267

ANTI-VIBRATION MOUNTING DEVICES

Alfred William John Wells, Llangoed, Anglesey, North Wales, assignor, by direct and mesne assignments, of one-half to A. Wells & Company Limited, London, England, a British company, and one-half to United-Carr Fastener Corporation, Boston, Mass., a corporation of Delaware Application February 1, 1954, Serial No. 407,531

3 Claims. (Cl. 248—358)

An anti-vibration mounting is described in U. S. Patent No. 2,600,090 comprising an annular base member, a columnar member passing centrally through the opening in the base member, and two sets of helical springs, one set on each side of the base member, the springs extending between and being secured at their opposite ends to the base member and to the columnar member respectively, being arranged with their axes on the surfaces of two opposed cones the generating lines of which are inclined to the base member at angles such that the springs offer substantially equal resistance to movement between the base member and the columnar member in all planes, and being initially tensioned and held under equal tension when the mounting is not loaded.

In such a device it is desirable to provide means for damping resonant vibration in the springs, and U. S. Patent No. 2,600,090 describes the provision, for the purpose, of two opposed cups mounted to slide on the columnar member, and a spring mounted in compression between the cups and urging them apart and into contact with the inner surfaces of the springs. This arrangement, however, leaves unsupported a substantial length of each spring between its anchorage to the base member and the point at which it bears against the cup. An alternative type of vibration damper suggested in U. S. Patent No. 2,600,090 consists of a wire spring of hairpin shape disposed within each helical spring, the centre portion of the wire spring being hooked over the anchorage supporting one end of the helical spring and its limbs pressing against the inner surface of the helical springs. Such an arrangement is, however, unsuitable for mass production, particularly in the case of mounting devices of small size.

This invention aims to provide an alternative form of vibration damper for the helical coil springs of anti-vibration mountings of the kind described in U. S. Patent No. 2,600,090. It is, however, not restricted to mountings in which the generating lines of the two opposed cones are inclined to the base member at angles such that the mounting offers substantially equal resistance to movement in all planes, or indeed to mountings embodying two sets of helical springs. It is applicable also to mountings which include one set of helical springs only, the supported member being supported by other resilient means at the side of the base member remote from the helical springs.

The principal object of this invention is to provide an improved mounting device of the above type which is substantially free from resonant vibrations. Another object of the invention is to provide such a mounting device having an improved structure for reducing resonant vibrations to a minimum.

In another aspect, a principal object of the invention is to provide improved means for damping the resonant vibrations of a coil spring. Another object is to provide improved means for damping the resonant vibrations of a mounting device having coil springs.

A further object of the invention is to provide in an anti-vibration mounting of the above type improved devices for restricting radial movement of the supported member in relation to the base member.

Certain embodiments of the invention will now be described in detail, by way of example, with reference to the accompanying drawings, in which:

Fig. 1 is a plan view, partly broken away, of a mounting embodying external split-metal tubes as vibration dampers, Fig. 2 is a section on the line II—II in Fig. 1, Fig. 3 is a view, similar to that of Fig. 2 but showing a mounting in which the vibration dampers are constituted by internal split metal tubes, Fig. 4 is a view of a helical spring fitted with a wire mesh vibration damper, Fig. 5 is a plan view of a third form of mounting, and Fig. 6 is a section on the line VI—VI in Fig. 5.

The mounting shown in Figs. 1 and 2 comprises an annular base plate 10 and a columnar supported member constituted by a tube 11, disposed vertically and axially in the hole in the base plate and supported in relation to the base plate by two sets of helical springs 12. As shown the ends 13 of the springs are looped over wire rings 14, 15 attached respectively to the base plate 10 and to the tube 11. The springs 12 are initially tensioned and held under equal tension when the mounting is not loaded, and are arranged on the surface of two opposed cones, the generating lines of which are inclined to the base plate 10 at an angle, normally 30–40°, such that the springs offer substantially equal resistance to movement between the base plate 10 and the tube 11 in all planes. The base plate 10 may be attached to a fixed support and the member to be supported carried by the tube 11, e. g., by a passage of a bolt through it. Alternatively the tube 11 can be attached to a fixed support and the member to be supported may be attached to the base plate.

Surrounding each of the springs 12 is a vibration damper constituted by a split metal tube 16. In the alternative arrangement shown in Fig. 3, the vibration dampers are constituted by split metal tubes 17 fitted inside the springs 12. Such a split metal tube 17 can readily be fitted into the helical spring 12 before one of its two ends 13 is looped and, in the case of external application, the split metal tube 16 can be fitted over the spring 12 after both of its ends 13 have been looped. The tubes 16 and 17 can readily be fitted to the springs even when the springs are of very small size. The tube 17, when internal, is compressed slightly to close the slot in it, so that it may be pushed into the helical spring. It thereafter expands into contact with the inner wall of the spring. In the external case, the tube 16 is expanded slightly to enable it to be pushed over the helical spring, and thereafter contracts into contact with the outer wall of the spring. In either case, the tube can readily accommodate itself to the small variations in diameter of the helical spring, which are necessary in mass production, to obtain mountings of standard performance, in view of variations in tensile strength of the wire from which the springs are made.

In the arrangements shown in Figs. 1–3 stop members 18 are provided on the ends of the tube 11. These coact with the base plate 10 to prevent excessive axial movement of the tube in relation to the base plate. In the arrangement of Figs. 1 and 2, excessive radial movement of the tube in relation to the base plate is prevented by a sheet metal jacket 19 surrounding the tube 11 and having a number of spring fingers 20 engaging the tube. The jacket 19 constitutes a buffer which may yield, when it contacts the base plate, by virtue of the fingers 20 sliding along the tube 11. In the case of Fig. 3, the tube 11 has an enlarged central portion 21 which coacts with the edge of the hole in the base plate 10 to prevent excessive radial movement of the tube.

In place of the external or internal split metal sleeves 16, 17 the invention contemplates the use, for damping resonant vibrations in the coil springs 12 of the mounting, of external damping sleeves 26 of close mesh wire fitted to the springs 12 as shown in Fig. 4.

In the embodiment shown in Figs. 5 and 6, the coil springs 12 of the mounting are again fitted with external split metal damping sleeves 16. In this case the base member is constituted by two circular base plates 10, joined by eyelets 23 and supporting between them an apertured plate 24. Turned over spring fingers 25 on the rim of the hole in the plate 24 serve to restrict radial movement of the tube 11.

What I claim as my invention and desire to secure by Letters Patent is:

1. An anti-vibration mounting comprising an apertured base member, a columnar member extending centrally through the aperture in the base member and disposed normally in spaced relation to the marginal edge portions of the base member defining the aperture therein, separate means resiliently supporting each end of the columnar member, the means supporting one of said ends including a set of helical springs extending between the marginal edge portions of the base member and said one end with their axes so disposed as to lie on the surface of an imaginary cone, and a sheet metal tubular member surrounding said columnar member in concentric relation, said tubular member having spring fingers engaging the columnar member and supporting said tubular member in spaced relation to the columnar member, whereby the tubular member will coact with the base member and the means resiliently supporting the ends of the columnar member to restrict radial movement of the columnar member.

2. An anti-vibration mounting comprising an apertured base member, a columnar member extending centrally through the aperture in the base member and disposed normally in spaced relation to the marginal edge portions of the base member defining the aperture therein, separate means resiliently supporting each end of the columnar member, the means supporting one of said ends including a set of helical springs extending between the marginal edge portions of the base member and said one end with their axes so disposed as to lie on the surface of an imaginary cone, and spring fingers made of metal extending radially inwardly from the marginal edge portions of the base member whereby the spring fingers may coact with the columnar member to restrict radial movement of the columnar member.

3. An anti-vibration mounting device comprising an apertured base member, a columnar member extending centrally through the aperture in the base member and normally disposed in spaced relation to the marginal edge portions of the base member defining the aperture, separate means resiliently supporting each end of the columnar member, the means supporting one of said ends including a set of helical springs extending between the marginal edge portions of the base member and said one end with their axes so disposed as to lie on the surface of an imaginary cone, and a quantity of metal sleeves made of thin wire mesh, each sleeve disposed in concentric closely embracing relationship with a corresponding one of said helical coil springs, the inner surface of said sleeve frictionally engaging the adjacent surface of the helical coil spring.

References Cited in the file of this patent

UNITED STATES PATENTS

| 2,519,702 | Robinson | Aug. 22, 1950 |
| 2,539,443 | Lee | Jan. 30, 1951 |
| 2,595,135 | Greenslade | Apr. 29, 1952 |
| 2,597,878 | Lee | May 27, 1952 |
| 2,658,710 | Titus | Nov. 10, 1953 |
| 2,680,585 | Crede | June 8, 1954 |

FOREIGN PATENTS

| 571,026 | Great Britain | Aug. 2, 1945 |